US012737022B2

(12) United States Patent
Chang

(10) Patent No.: US 12,737,022 B2
(45) Date of Patent: Sep. 15, 2026

(54) LOW BATTERY VOLTAGE PROTECTION METHOD FOR MICROCONTROLLER SYSTEM AND MICROCONTROLLER SYSTEM USING THE SAME

(71) Applicant: NUVOTON TECHNOLOGY CORPORATION, Hsinchu City (TW)

(72) Inventor: Pao-Shu Chang, Zhubei City (TW)

(73) Assignee: NUVOTON TECHNOLOGY CORPORATION, Hsinchu City (TW)

( * ) Notice: Subject to any disclaimer, the term of this patent is extended or adjusted under 35 U.S.C. 154(b) by 127 days.

(21) Appl. No.: 18/953,539

(22) Filed: Nov. 20, 2024

(65) Prior Publication Data

US 2025/0370518 A1 Dec. 4, 2025

(30) Foreign Application Priority Data

May 28, 2024 (TW) ................................ 113119702

(51) Int. Cl.

| | |
|---|---|
| ***H02J 9/06*** | (2006.01) |
| ***G05F 1/569*** | (2006.01) |
| ***G06F 1/26*** | (2006.01) |
| ***H01M 10/42*** | (2006.01) |
| *H02M 1/00* | (2007.01) |
| *H02M 5/42* | (2006.01) |

(52) U.S. Cl.

CPC ................ *G06F 1/26* (2013.01); *G05F 1/569* (2013.01); *H01M 10/425* (2013.01); *H01M 2010/4271* (2013.01)

(58) Field of Classification Search

None

See application file for complete search history.

(56) References Cited

U.S. PATENT DOCUMENTS

| | | | | |
|---|---|---|---|---|
| 5,483,145 A * | 1/1996 | Shiojima | H02J 7/977 | 320/155 |
| 2009/0089605 A1* | 4/2009 | Westwick | H03K 17/223 | 713/340 |
| 2010/0327960 A1* | 12/2010 | Huber | H03K 19/0016 | 327/538 |
| 2012/0299545 A1* | 11/2012 | Kuraishi | H02J 9/005 | 320/112 |
| 2014/0167700 A1* | 6/2014 | Chen | H02H 7/18 | 320/134 |

(Continued)

*Primary Examiner* — Kim Huynh

(74) *Attorney, Agent, or Firm* — MUNCY, GEISSLER, OLDS & LOWE, P.C.

(57) ABSTRACT

A low battery voltage protection method for a microcontroller system and a microcontroller system using the same are provided. The low battery protection method and the microcontroller system are used to prevent continuous battery drain by setting time thresholds and a count threshold. In an embodiment, when a low-voltage power-on reset voltage is not exceeded within a first preset time, the microcontroller system is forced to enter a sleep mode to prevent power consumption by an analog block. In another embodiment, when the low-voltage power-on reset voltage is exceeded, but a reset count of the microcontroller system exceeds a preset value within a second preset time, the microcontroller system is also forced to enter the sleep mode to prevent a digital block from continuously loading data, which could lead to battery failure.

8 Claims, 5 Drawing Sheets

(56) References Cited

U.S. PATENT DOCUMENTS

2015/0042300 A1* 2/2015 Peker .................... H02M 3/156 323/274
2016/0048182 A1* 2/2016 Liu .......................... G06F 1/24 713/1

* cited by examiner

LOW BATTERY VOLTAGE PROTECTION METHOD FOR MICROCONTROLLER SYSTEM AND MICROCONTROLLER SYSTEM USING THE SAME

CROSS-REFERENCE TO RELATED APPLICATION

This application claims the priority from the TW Patent Application No. 113119702, filed on May 28, 2024, and all contents of such TW Patent Application are comprised in the present disclosure.

BACKGROUND

1. Field of the Invention

The present disclosure is related to microprocessor technologies, and in particular to a low battery voltage protection method for a microcontroller system and a microcontroller system using the same.

2. Description of the Related Art

When designing a battery-powered microcontroller system, battery power management is a critical consideration. The system typically detects two key voltages during an activation period: power-on reset (POR) voltage and low-voltage power-on reset voltage (LVPOR). When the battery voltage rises to the POR voltage, the circuit activates a Low-dropout Regulator (LDO) to ensure that the system obtains a stable power supply. However, if the output voltage of the LDO barely exceeds the standard of the LVPOR, it may cause some serious problems in the system.

In this case, the microcontroller may fail to correctly load and perform program code from a Read-Only Memory (ROM). The reason is that data stored in the ROM may be misread or misinterpreted at low voltage. As a result, the microcontroller may perform invalid or incorrect instructions, causing the system to behave unpredictably or complete failure to activate at all. In addition to accessing the ROM, insufficient battery power may also affect normal operations of other key components in the microcontroller system. For example, the Random Access Memory (RAM) may not correctly store or read data, thereby destroying temporary storage and computational capability of the system. Furthermore, peripherals (e.g., sensors or actuators) may also fail to operate properly or communicate with the microcontroller due to insufficient voltage. In the worst-case scenario, the system may frequently reset or enter an unstable state. This not only causes abnormal operation but may also lead to serious consequences caused by liquid leakage due to frequent battery discharge.

SUMMARY

An embodiment of the present disclosure provides a low battery voltage protection method for a microcontroller system and a microcontroller system using the same, designed to prevent the microcontroller from continuously loading data with errors, which could result in continuous power drain.

Another embodiment of the present disclosure provides a low battery voltage protection method for a microcontroller system and a microcontroller system using the same, designed to prevent frequent battery discharge, which could lead to leakage and damage to circuit components.

An embodiment of the present disclosure provides a low battery voltage protection method for a microcontroller system, adapted for a battery used to be a power supply. The low battery voltage protection method includes the following steps: when the microcontroller system is activated, sequentially performing a first check, a second check, and a third check; wherein the first check includes: detecting whether a battery voltage of the battery is greater than a first voltage; when the battery voltage is not greater than the first voltage, keeping the microcontroller system in a reset state; and when the battery voltage is greater than the first voltage, performing the second check; wherein the second check includes: activating a low-dropout regulator (LDO); detecting whether an output voltage of the LDO is greater than a second voltage; when the output voltage of the LDO is not greater than the second voltage within a first preset time, forcing the microcontroller system to enter a sleep mode; and when the output voltage of the LDO is greater than the second voltage within the first preset time, performing the third check; wherein the third check includes: checking a number of reset times of the microcontroller system within a second preset time; when the number of reset times is greater than a preset value, forcing the microcontroller system to enter the sleep mode.

An embodiment of the present disclosure provides a microcontroller system, including: a battery voltage detection circuit, a low-dropout regulator (LDO), an output voltage detection and timer circuit, a microcontroller block, and a counter circuit. The battery voltage detection circuit is configured to receive a battery voltage, determine whether the battery voltage is greater than a first voltage, and enable a first enable signal when the battery voltage detection circuit determines that the battery voltage is greater than the first voltage. The LDO is configured to receive the first enable signal, and output an output voltage when the first enable signal is enabled. The output voltage detection and timer circuit is configured to receive the output voltage, determine whether the output voltage is greater than a second voltage within a first preset time, and enable a second enable signal when the output voltage is greater than the second voltage within the first preset time. The microcontroller block is configured to receive the second enable signal, wherein the microcontroller block is activated when the second enable signal is enabled. The counter circuit is configured to check a number of reset times of the microcontroller block within a second preset time. The microcontroller system is forced to enter the sleep mode when the number of the reset times is greater than a preset value within the second preset time. The microcontroller system is forced to enter the sleep mode when the output voltage fails to be greater than the second voltage after the first preset time.

According to an embodiment of the low battery voltage protection method and the microcontroller system, the first voltage is a power-on reset (POR) voltage. In a preferred embodiment, the second voltage is a low-voltage power-on reset (LVPOR) voltage. In a preferred embodiment, when an error occurs while the microcontroller block fails to read a program code stored in a read-only memory (ROM).

According to the above, embodiments of the present disclosure use two methods to prevent the microcontroller from continuously consuming battery electricity/power. In one situation, when the analog block is activated, as long as the output voltage output by the LDO of the analog block fails to reach the specific voltage after a period of time, the entire microcontroller is forced to enter the sleep mode to prevent the analog block from continuously draining power.

In the other situation, as long as the battery power is insufficient, the digital block will continuously generate errors within a period of time even after the digital block is activated, and the entire microcontroller is forced to enter the sleep mode to prevent continuous data loading errors that would otherwise lead to continuous power consumption.

To further understand the technology, means, and effects of the present disclosure, reference may be made by the detailed description and drawing as follows. In this way, the purposes, features and concepts of the present disclosure can be thoroughly and concretely understood. However, the following detail description and drawings are only used to reference and illustrate the implementation of the present disclosure, and they are not used to limit the present disclosure.

BRIEF DESCRIPTION OF THE DRAWINGS

The drawings are provided to make the persons with ordinary knowledge in the field of the art further understand the present disclosure, and are incorporated into and constitute a part of the specification of the present disclosure. The drawings illustrate exemplary embodiments of the present disclosure, and are used to explain the principal of the present disclosure together with the description of the present disclosure.

DESCRIPTION OF THE PREFERRED EMBODIMENTS

Figure 1:
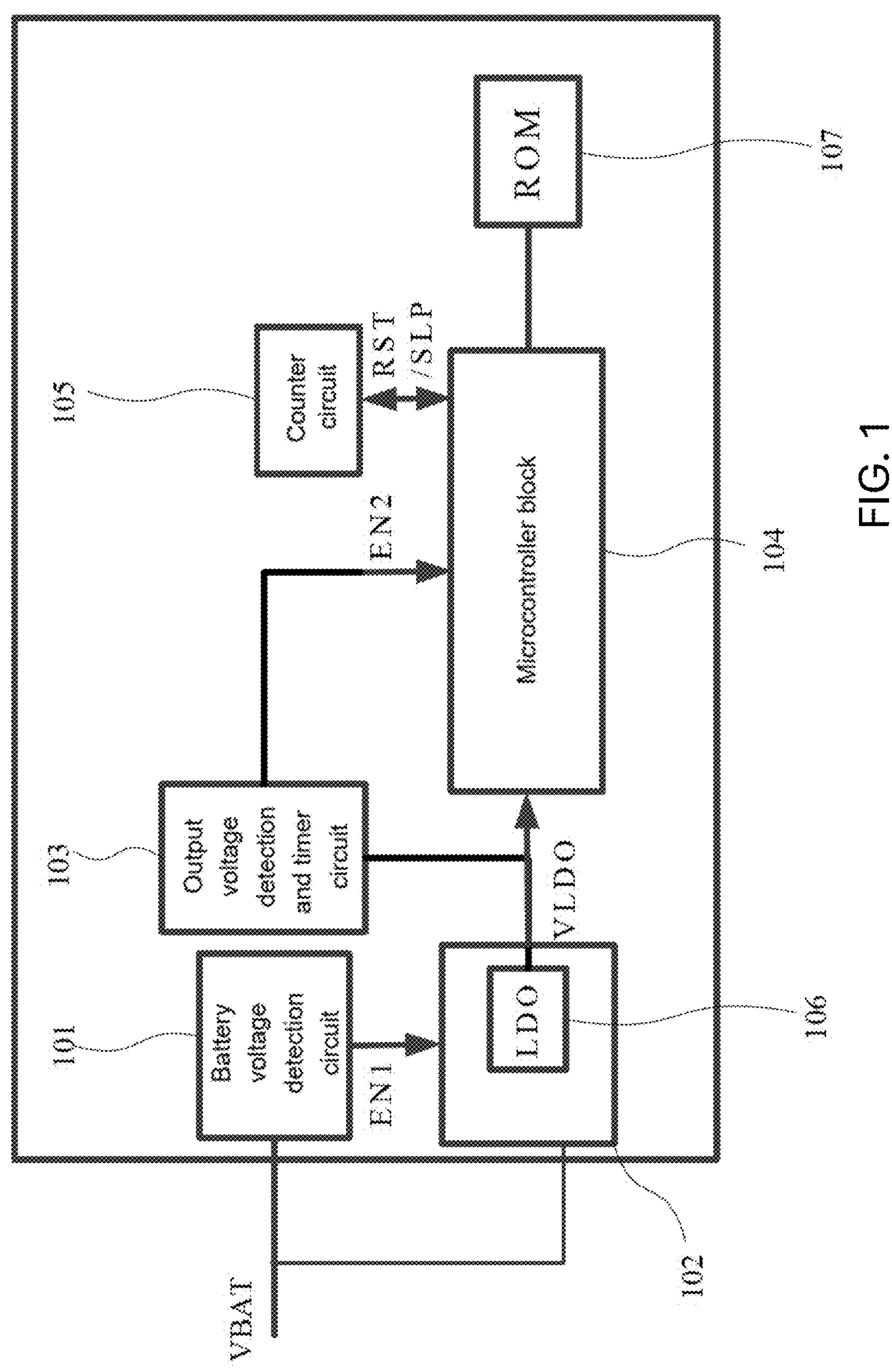
FIG. 1 is a schematic system block diagram of a microcontroller system according to a preferred embodiment of the present disclosure.

The embodiments of the present disclosure are described in detail as reference, and the drawings of the present disclosure are illustrated. Where possible, the same reference numerals are used in the drawings and the description to refer to the same or similar components. In addition, an embodiment represents only one approach of the implementation of the design concept of the present disclosure, and the following embodiments are not intended to limit the present disclosure.

FIG. 1 is a schematic system block diagram of a microcontroller system according to a preferred embodiment of the present disclosure. Please refer to FIG. 1, the microcontroller system includes a battery voltage detection circuit 101, an analog block 102, an output voltage detection and timer circuit 103, a microcontroller block 104, and a counter circuit 105. The analog block 102 includes a low drop regulator (LDO) 106 for providing a power supply to the microcontroller block 104. For convenience of explanation, a read-only memory (ROM) 107 is also illustrated in this embodiment. The ROM 107 is configured to store the firmware or execution code required for the operation of the microcontroller system.

Figure 2:
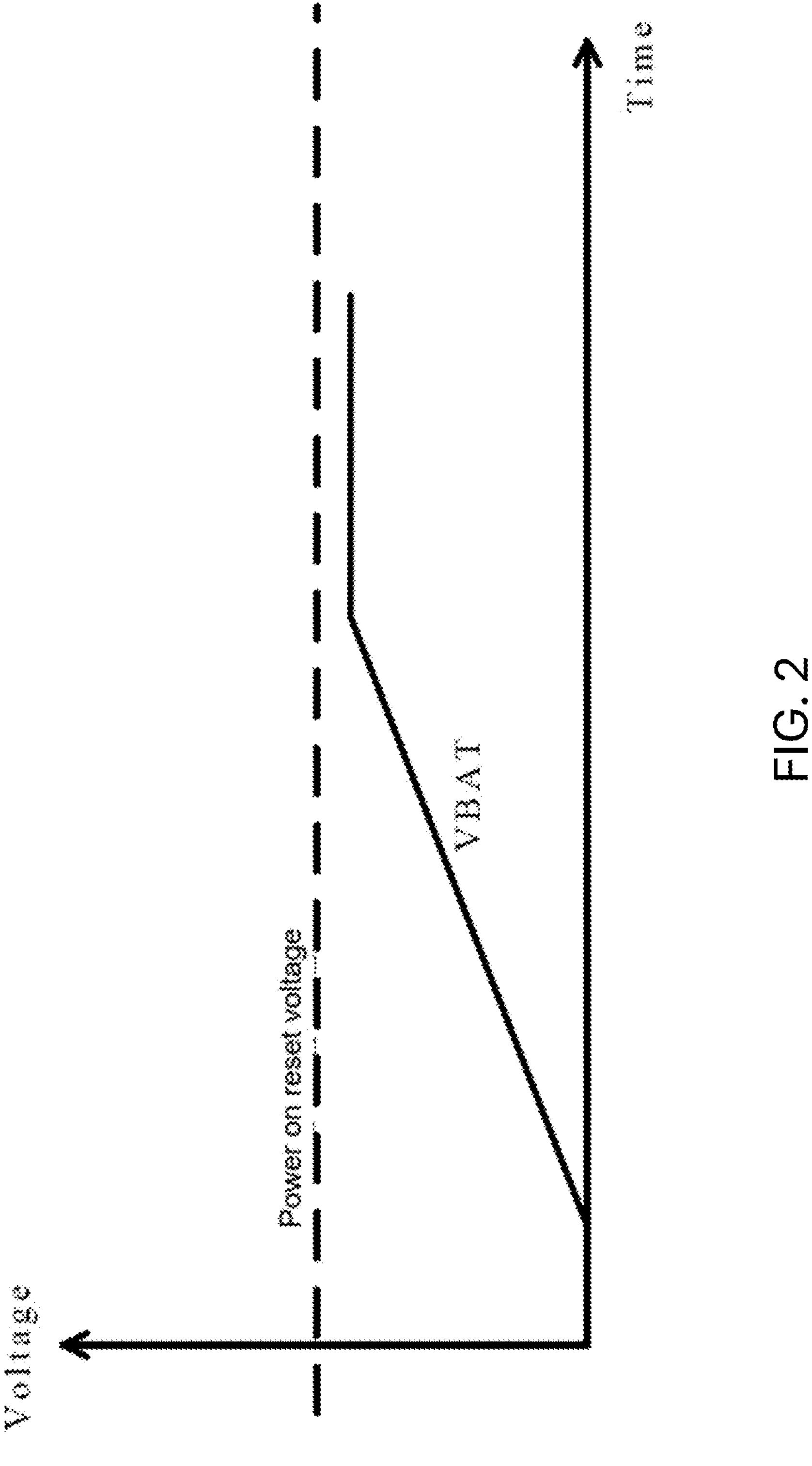
FIG. 2 is a schematic relation diagram between a battery voltage VBAT and a POR voltage according to a preferred embodiment of the present disclosure.

Generally, integrated circuit (IC) systems have an activation mechanism, which is generally referred to as a Power-On Sequence. In this embodiment, the battery voltage detection circuit 101 may be a power-on reset (POR) circuit. The battery voltage detection circuit 101 receives the battery voltage VBAT and determines whether the battery voltage VBAT is greater than a first voltage, which is the POR voltage. FIG. 2 is a schematic relation diagram between a battery voltage VBAT and the POR voltage according to a preferred embodiment of the present disclosure. Please refer to FIG. 2, when the battery voltage detection circuit 101 determines that the battery voltage VBAT is less than the POR voltage, indicating insufficient battery power, the first enable signal EN1 is disabled, and the analog block 102 is not activated. When the battery voltage detection circuit 101 determines that the battery voltage VBAT is greater than the POR voltage, the first enable signal EN1 is enabled.

When receiving the enabled first enable signal EN1, the analog block 102 is activated, allowing the internal LDO 106 to output an output voltage VLDO. The output voltage VLDO supplies power to the microcontroller block 104 for operation. However, if the output voltage VLDO is not high enough, the microcontroller block 104 cannot properly operate or may easily generate operational errors. Thus, the output voltage detection and timer circuit 103 receives the output voltage VLDO, starts timing, and determines whether the output voltage is greater than a second voltage within a first preset time T1. In this embodiment, the second voltage is a low-voltage power-on reset voltage (LVPOR).

Figure 3:
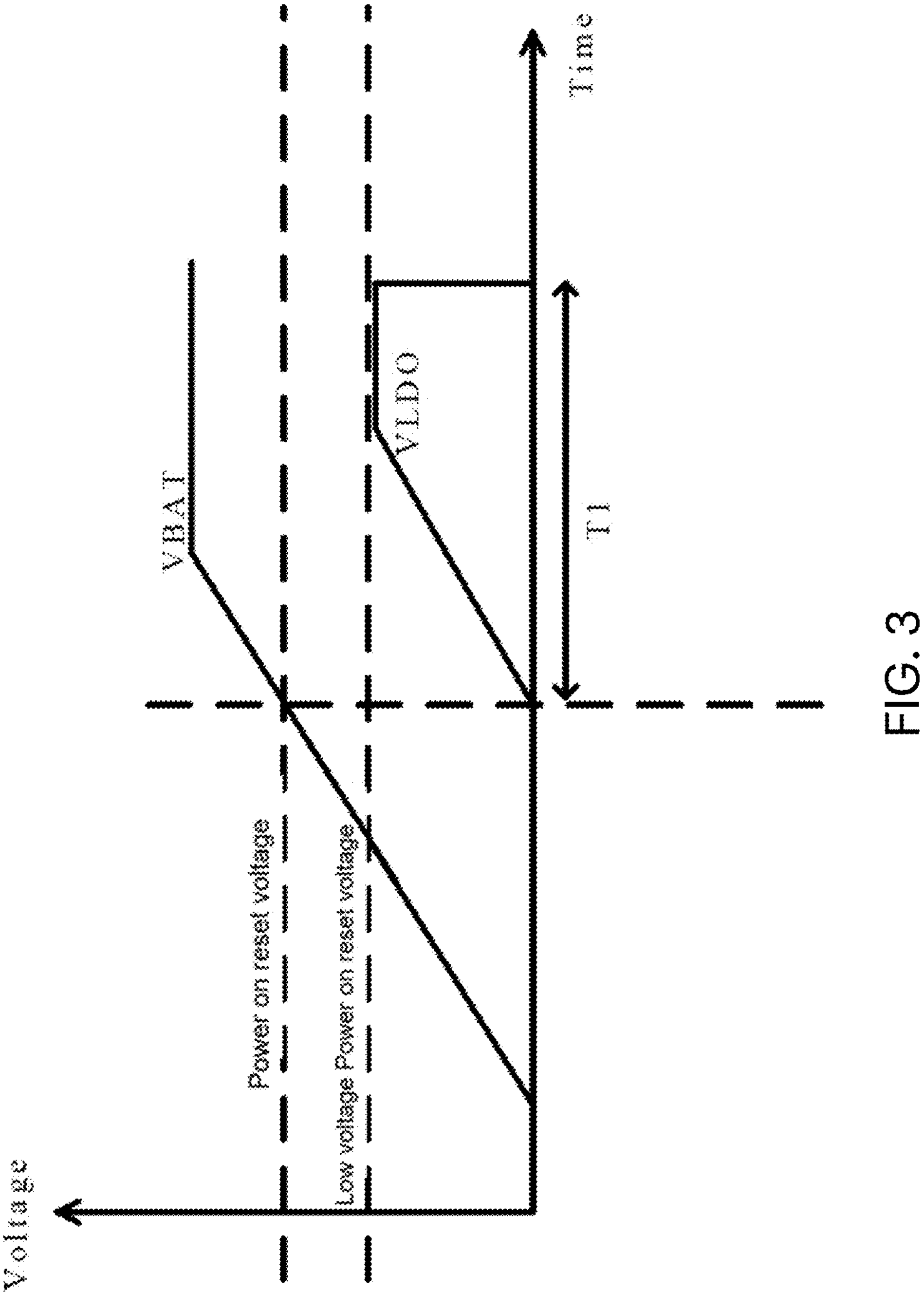
FIG. 3 is a schematic relation diagram between an output voltage VLDO and a POR voltage according to a preferred embodiment of the present disclosure.

FIG. 3 is a schematic relation diagram between an output voltage VLDO and a POR voltage according to a preferred embodiment of the present disclosure. Please refer to FIG. 3, the battery power is generally determined based on the battery voltage VBAT, but the actual power of each battery may be different. Some batteries may not have enough power to supply sufficient output voltage VLDO even if the battery voltage VBAT exceeds the POR voltage. In addition, in this embodiment, the first preset time T1 is intentionally set. The first preset time T1 starts timing from the moment the battery voltage VBAT exceeds the POR voltage. Since the battery voltage VBAT exceeding the POR voltage does not necessarily guarantee sufficient power, if the LDO 106 does not generate a sufficiently high output voltage VLDO within the first preset time T1, it also indicates insufficient battery power. At this point, not only the second enable signal EN2 is disabled, but the entire microcontroller system is also be forced to enter the sleep mode. The circuit of the analog block 102 is also turned off to save power consumption.

Figure 4:
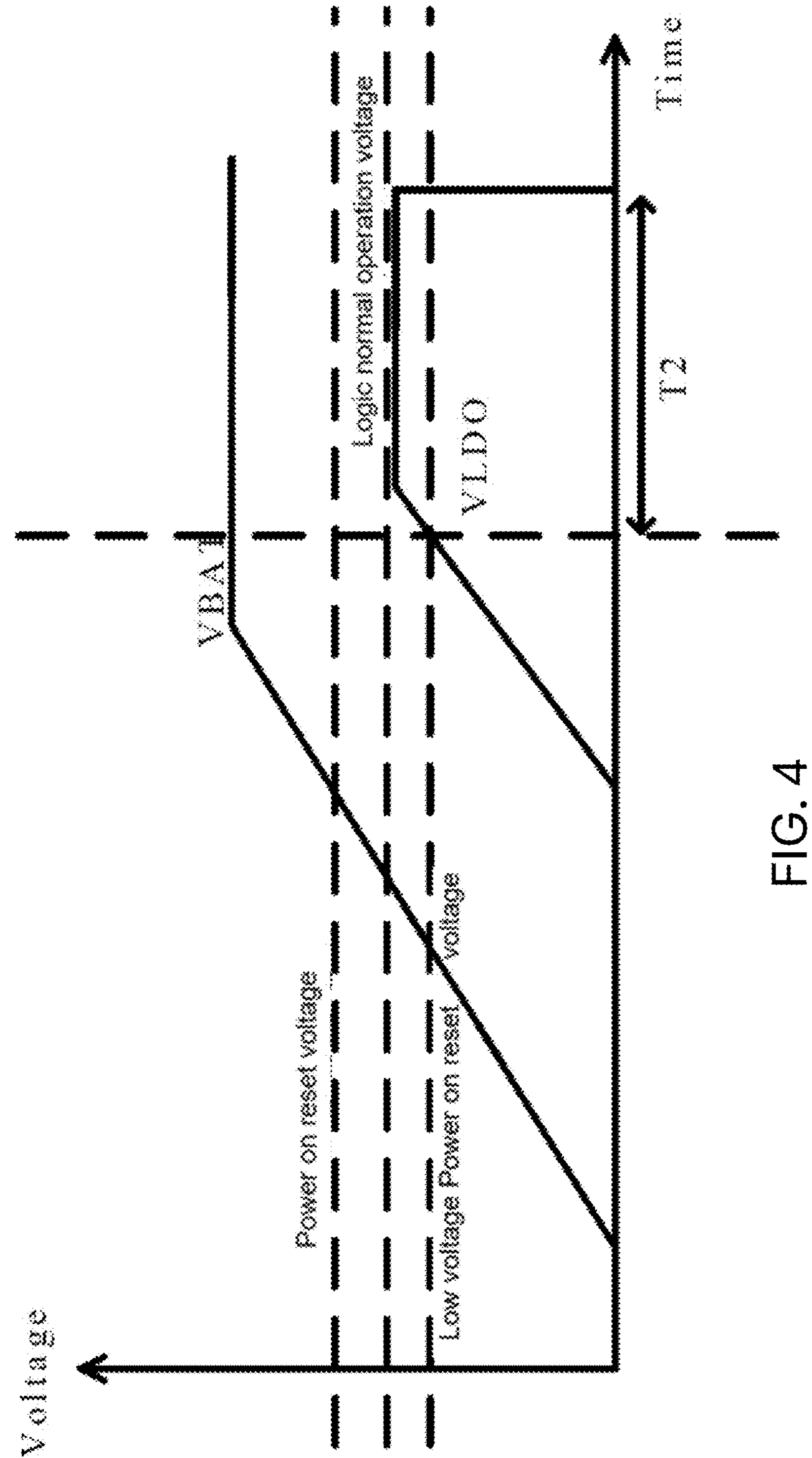
FIG. 4 is a schematic relation diagram between an output voltage VLDO and a POR voltage according to a preferred embodiment of the present disclosure.

FIG. 4 is a schematic relation diagram between an output voltage VLDO and a POR voltage according to a preferred embodiment of the present disclosure. Please refer to FIG. 4, when the output voltage VLDO is greater than the second voltage (i.e., the LVPOR voltage) within the first preset time T1, the output voltage detection and timer circuit 103 enables a second enable signal EN2. The microcontroller block 104 receives the enabled second enable signal EN2 and starts activation. At this point, the counter circuit 105 is also activated. For example, after receiving the second enable signal EN2, the microcontroller block 104 starts loading the firmware or execution code from the ROM 107. However, since the battery power remains insufficient, even though the output voltage VLDO output by the LDO 106 is already higher than the LVPOR voltage, it is still likely to be lower than logic normal operation voltage. For circuit designers, the logic normal operation voltage is typically unpredictable due to slight variations in each circuit. If the output voltage VLDO is lower than this operating voltage range, the microcontroller block 104 may frequently fail to correctly read the firmware or execution code from ROM 107, leading to errors.

Thus, in this embodiment, after the output voltage VLDO output by the LDO 106 is greater than the LVPOR voltage, the counter circuit 105 still starts timing, and starts counting the number of errors occurring in the microcontroller block 104 within the second preset time T2. When an error occurs, the microcontroller block 104 is reset. The counter circuit 105 continuously detects the number of reset times of the microcontroller block 104 during the second preset time T2. When the number of resets times within the second preset time T2 is greater than a preset value, the counter circuit 105 forces the entire microcontroller system to enter the sleep mode.

In the above embodiment, when the battery voltage VBAT is greater than the POR voltage, and the output voltage VLDO output by the LDO 106 exceeds the LVPOR voltage, the digital logic circuit of the microcontroller block 104 starts to operate. At this point, the system consumes between a few milliamps (mA) to tens of milliamps. However, when the battery voltage is low, its internal resistance increases, causing the battery voltage to drop. Once the battery voltage drops below the operating voltage of the digital logic circuit, the system is forced to reset (e.g., due to incorrect instruction decoding or jumping to an unexpected loop, generating a watchdog timer reset). Without the protection of the counter circuit 105, the microcontroller block 104 would continue operating, and the battery would continuously consume tens of milliamps of current. This would lead to chemical reactions in the battery, producing hydrogen gas and causing the leakage of corrosive battery fluid, which could damage the device. According to the above operations of the preferred embodiment of the present disclosure, in addition to reducing power consumption, the entire microcontroller system is also protected.

Figure 5:
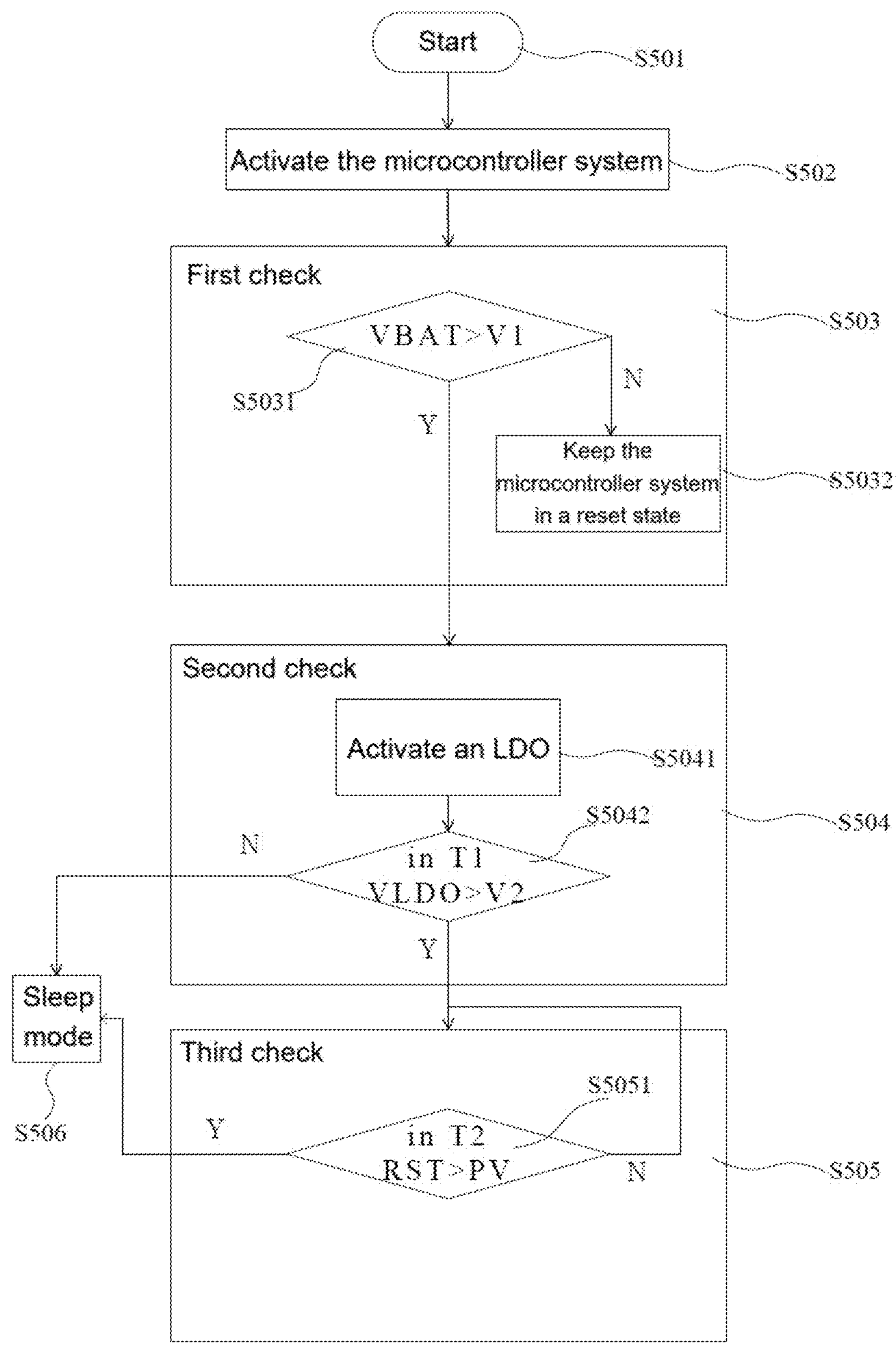
FIG. 5 is a schematic flowchart diagram of a low battery voltage protection method for a microcontroller system according to a preferred embodiment of the present disclosure.

According to the aforementioned embodiments, a low battery voltage protection method for a microcontroller system may be summarized. FIG. 5 is a schematic flowchart diagram of a low battery voltage protection method for a microcontroller system according to a preferred embodiment of the present disclosure. Please refer to FIG. 5, the low battery voltage protection method includes the following steps:

Step S501: Start.

Step S502: Activate the microcontroller system.

Step S503: Perform a first check, which includes.

Step S5031: Detect whether a battery voltage VBAT of a battery is greater than a first voltage V1. In this embodiment, the first voltage V1 is, for example, the aforementioned POR voltage. When the battery voltage VBAT is greater than the first voltage V1, perform a second check in Step S504. When the battery voltage VBAT is lower than the first voltage V1, perform Step S5032.

Step S5032: Keep the microcontroller system in a reset state.

Step S504: Perform the second check, which includes:

Step S5041: Activate an LDO.

Step S5042: Detect whether an output voltage VLDO of the LDO is greater than a second voltage V2 within a first preset time T1. When the battery voltage VBAT is greater than the aforementioned POR voltage, the output voltage detection and timer circuit 103 detects whether the output voltage VLDO of the LDO 106 is greater than the second voltage V2 within the first preset time T1, such as the aforementioned LVPOR voltage. When the output voltage VLDO of the LDO 106 is greater than the second voltage V2 within the first preset time T1, perform a third check in Step S505. When the output voltage VLDO of the LDO is less than the second voltage V2 within the first preset time T1, perform Step S506.

Step S506: Force the microcontroller system to enter a sleep mode.

Step S505: Perform the third check, which includes:

Step S5051: Detect whether a number of resets times RST of the microcontroller system is greater than a preset value PV within a second preset time T2. Similar to the aforementioned embodiment, after the output voltage VLDO is charged to the LVPOR voltage within the first preset time T1, the system may still be unstable. Thus, in this embodiment, the third check mechanism is added. The counter circuit 105 times the second preset time T2. When the number of resets times RST of the microcontroller system is greater than the preset value PV within the second preset time T2, perform Step S506, forcing the microcontroller system to enter the sleep mode. As such, it prevents continuous battery consumption, which could otherwise cause battery leakage.

In summary, embodiments of the present disclosure use two methods to prevent the microcontroller from continuously consuming battery electricity/power. In one situation, when the analog block is activated, as long as the output voltage output by the LDO of the analog block fails to reach the specific voltage after a period of time, the entire microcontroller is forced to enter the sleep mode to prevent the analog block from continuous power consumption. In the other situation, as long as the battery is insufficient, the digital block will continuously generate errors within a period of time even after the digital block is activated, and the entire microcontroller is forced to enter the sleep mode to prevent the microcontroller from continuously loading data and causing continuous power consumption due to errors.

It should be understood that the examples and the embodiments described herein are for illustrative purpose only, and various modifications or changes in view of them will be suggested to those skilled in the art, and will be comprised in the spirit and scope of the application and the appendix with the scope of the claim.

What is claimed is:

1. A low battery voltage protection method for a microcontroller system, adapted for a battery used to be a power supply, wherein the low battery voltage protection method comprises:

determining that the microcontroller system is activated;

sequentially performing:

comparing a battery voltage of the battery against a first voltage threshold;

determining that the battery voltage is not greater than the first voltage threshold, and, in response, keeping the microcontroller system in a reset state; and determining that the battery voltage is greater than the first voltage threshold, and, in response, activating a low-dropout regulator (LDO);

comparing an output voltage of the LDO against a second voltage threshold;

determining that the output voltage of the LDO is not greater than the second voltage threshold within a first preset time, and, in response, forcing the microcontroller system to enter a sleep mode;

determining that the output voltage of the LDO is greater than the second voltage within the first preset time, and, in response, checking a number of reset times of the microcontroller system within a second preset time; and determining that the number of reset times is greater than a preset value, and in response forcing the microcontroller system to enter the sleep mode, wherein the second voltage threshold is lower than the first voltage threshold.

2. The low battery voltage protection method according to claim 1, wherein the first voltage is a power-on reset (POR) voltage.

3. The low battery voltage protection method according to claim 1, wherein the second voltage is a low-voltage power-on reset (LVPOR) voltage.

4. The low battery voltage protection method according to claim 1, wherein the microcontroller is reset when the microcontroller fails to read a program code stored in a read-only memory (ROM).

5. A microcontroller system, comprising:

a battery voltage detection circuit configured to receive a battery voltage, determine whether the battery voltage is greater than a first voltage, and enable a first enable signal when the battery voltage detection circuit determines that the battery voltage is greater than the first voltage;

a low-dropout regulator (LDO) configured to receive the first enable signal, and output an output voltage when the first enable signal is enabled;

an output voltage detection and timer circuit configured to receive the output voltage, determine whether the output voltage is greater than a second voltage within a first preset time, and enable a second enable signal when the output voltage is greater than the second voltage within the first preset time;

a microcontroller block configured to receive the second enable signal, wherein the microcontroller block is activated when the second enable signal is enabled; and a counter circuit configured to check a number of reset times of the microcontroller block within a second preset time;

wherein the second voltage is lower than the first voltage;

wherein the microcontroller system is forced to enter the sleep mode when the number of the reset times is greater than a preset value within the second preset time; and wherein the microcontroller system is forced to enter the sleep mode when the output voltage fails to be greater than the second voltage after the first preset time.

6. The microcontroller system according to claim 5, wherein the first voltage is a power-on reset (POR) voltage.

7. The microcontroller system according to claim 5, wherein the second voltage is a low-voltage power-on reset (LVPOR) voltage.

8. The microcontroller system according to claim 5, wherein the microcontroller block is reset when the microcontroller block fails to read a program code stored in a read-only memory (ROM).

* * * * *